United States Patent [19]

Hatch

[11] 4,246,325

[45] Jan. 20, 1981

[54] SODIUM-SULFUR BATTERY INCLUDING THERMALLY RESPONSIVE VALVE AND METHOD

[75] Inventor: Burton D. Hatch, Ballston Lake, N.Y.

[73] Assignee: Electric Power Research Institute, Inc., Palo Alto, Calif.

[21] Appl. No.: 54,470

[22] Filed: Jul. 3, 1979

[51] Int. Cl.³ .......................................... H01M 6/20
[52] U.S. Cl. ................................. 429/50; 429/64; 429/72; 429/104; 429/112
[58] Field of Search ............... 429/104, 62, 63, 72, 429/64, 50–52, 191, 193, 26, 34, 112

[56] References Cited

U.S. PATENT DOCUMENTS

| | | | |
|---|---|---|---|
| 3,758,337 | 9/1973 | Fally et al. | 429/62 |
| 4,011,366 | 3/1977 | Bones et al. | 429/61 |
| 4,029,858 | 6/1977 | Evans et al. | 429/104 |
| 4,048,391 | 9/1977 | Tilley et al. | 429/104 |
| 4,112,203 | 9/1978 | Anand | 429/104 |
| 4,189,530 | 2/1980 | Mitoff | 429/104 |

*Primary Examiner*—Anthony Skapars
*Attorney, Agent, or Firm*—Flehr, Hohbach, Test

[57] ABSTRACT

A sodium-sulfur battery including sodium and sulfur separated by a beta-alumina tube is disclosed herein along with a method of operating the battery utilizing a sodium storage and dispensing arrangement. This storage and dispensing arrangement includes a housing containing a supply of sodium out of contact with the beta-alumina tube and a thermally responsive bimetallic valve for passing sodium from its supply housing into contact with the beta-alumina separating tube when the sodium is in a liquid state and so long as the average temperature along at least a predetermined section of the tube remains below a predetermined value. In the event that this average temperature reaches the predetermined value, the bimetallic valve automatically prevents passage of liquid sodium from its supply housing to the beta-alumina tube.

18 Claims, 10 Drawing Figures

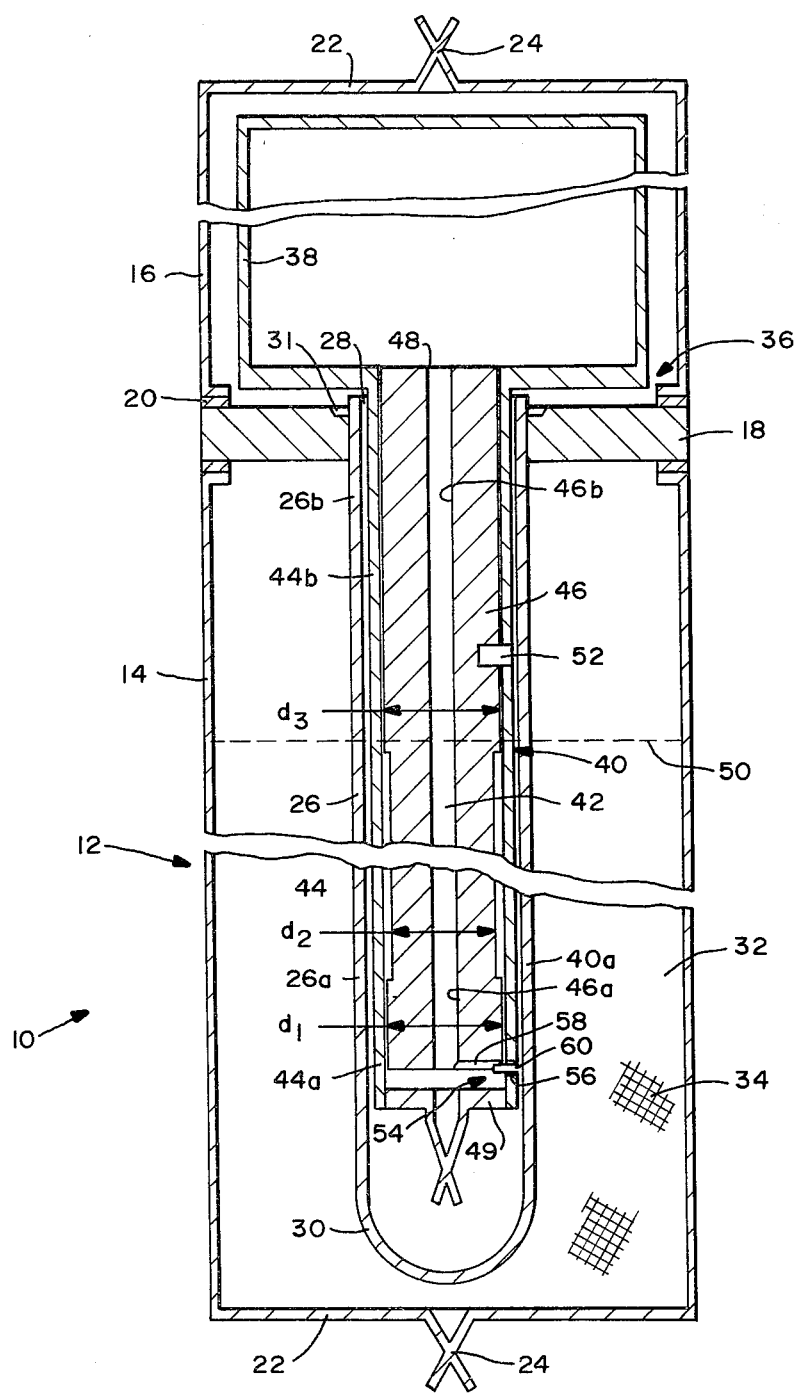
FIG.—1

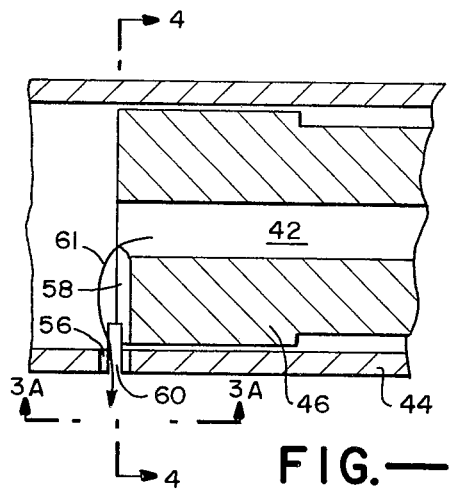
FIG.—2A
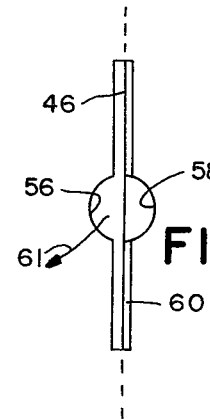
FIG.—3A
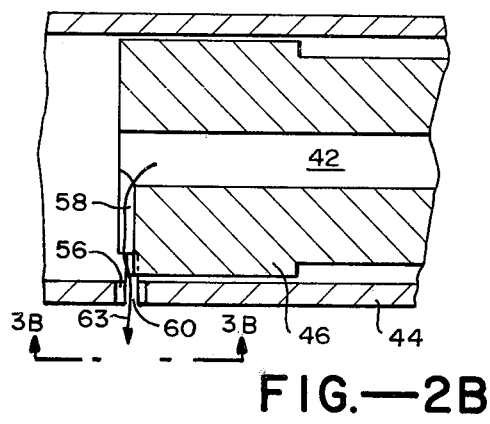
FIG.—2B
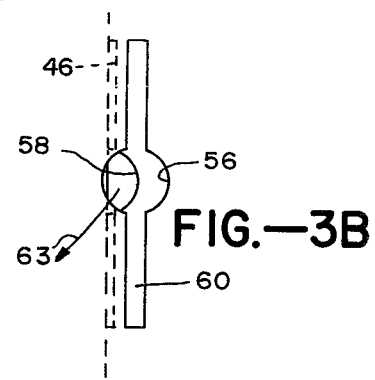
FIG.—3B
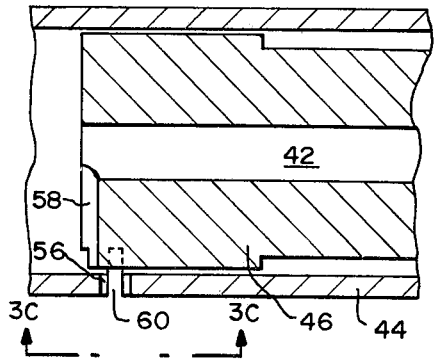
FIG.—2C
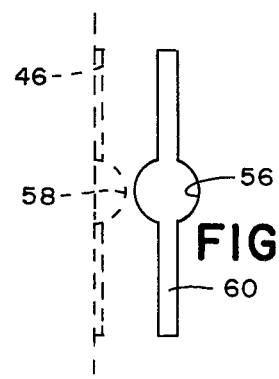
FIG.—3C
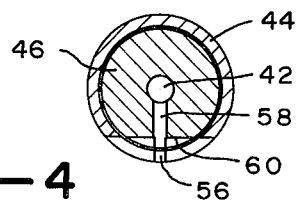
FIG.—4

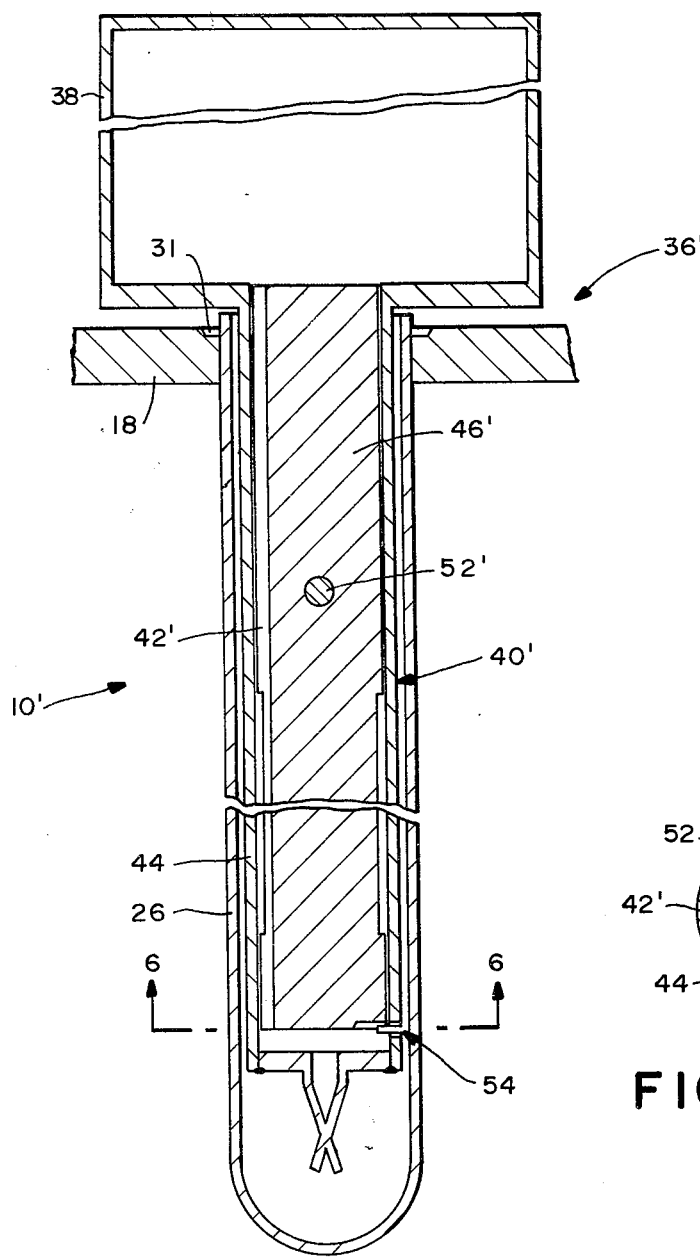
FIG.—5
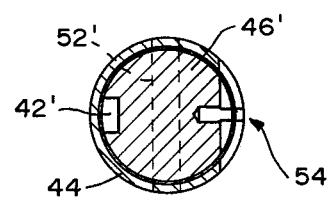
FIG.—6

SODIUM-SULFUR BATTERY INCLUDING THERMALLY RESPONSIVE VALVE AND METHOD

The present invention relates generally to sodium-sulfur batteries and more particularly to a sodium storage and dispensing arrangement for use in controlling the flow of sodium within such a battery.

A typical sodium-sulfur battery of the type to which the present invention is directed includes a supply of sodium which is continuously fed to and against one side of a beta-alumina separator which separates the sodium from a source of sulfur. This type of battery normally operates at a temperature of about 330° C., significantly higher than the melting point of sodium which is approximately 100° C. However, the temperature within this battery will rise beyond its normal operating temperature and, in fact, beyond safe limits in instances where the beta-alumina separator cracks sufficient to bring the sodium and sulfur in direct contact with one another. Obviously, the quantity of sodium which is available for direct chemical reaction with the sulfur will govern the extreme temperature within the battery.

Since the beta-alumina separator is relatively brittle and susceptible to crakcing, this poses a very real problem. One way of lessening this problem suggested by the prior art has been to provide a relatively narrow passageway or opening between the supply of sodium and the beta-alumina separator so that the amount of sodium fed into contact with the separator at any given time is small. However, this does not eliminate the problem altogether in that the battery will continue to operate at temperatures higher than normal so long as there is sodium available for direct reaction with the sulfur. As will be seen hereinafter, the approach taken by the present invention prevents continued reaction of sodium and sulfur in the sodium-sulfur battery at elevated, abnormal temperatures in an uncomplicated, economical and, most important, rapid and reliable way.

In view of the foregoing, one object of the present invention is to provide an uncomplicated, economical and yet rapid and reliable technique for automatically controlling the flow of sodium in a sodium-sulfur battery and particularly for discontinuing operation of the battery in the event of abnormally high temperatures.

Another object of the present invention is to provide a technique for automatically controlling sodium flow in a way which is responsive to localized hot spots within the battery.

Still another object of the present invention is to provide a technique which requires no human or electronic response to extraneous sensors.

Yet another object of the present invention is to provide a technique which does not require any significant redesign of the main components of the battery, that is, its outer housing, its beta-alumina tube and sulfur chamber contained within the outer housing.

Still another object of the present invention is to provide a technique which is applicable to cells of various sizes or rating and which does not adversely affect the electrical resistance and performance of the cell.

As will be seen hereinafter, the sodium-sulfur battery used in carrying out the foregoing objects utilizes a sodium storage and dispensing arrangement including housing means defining an inner chamber for containing a supply of sodium out of contact with its beta-alumina separating means. Moreover, in accordance with the present invention, this housing means includes thermally responsive sodium dispensing means for passing sodium out of its chamber and into contact with the separating means when the sodium is in a liquid state but only so long as the average temperature along at least a predetermined section of the separating means remains below a predetermined value. Should this average temperature reach the predetermined value, the dispensing means automatically and rapidly prevents further passage of sodium from its chamber to the separating means, thereby eliminating the availability of sodium for chemical reaction with the sulfur and reducing the resulting high temperatures. In a preferred embodiment, as will also be seen hereinafter, this is accomplished utilizing what may be considered a bimetallic valve means.

FIG. 1 is a longitudinal sectional view of a sodium-sulfur battery constructed in accordance with one embodiment of the present invention.

FIGS. 2A, 2B and 2C are enlarged longitudinal sectional views of a bottom portion of the battery of FIG. 1, each illustrating the battery at a different temperature.

FIGS. 3A, 3B and 3C are views taken generally along lines 3a—3b, 3b—3b and 3c—3c, respectively in FIGS. 2A, 2B and 2C.

FIG. 4 is a cross-sectional view taken generally along line 4—4 in FIG. 2A.

FIG. 5 is a longitudinal sectional view of a sodium-sulfur battery constructed in accordance with a second, preferred embodiment of the present invention.

FIG. 6 is a cross-sectional view taken generally along line 5—6 in FIG. 5.

Turning now to the drawing, wherein like components are designated by like reference numerals throughout the various figures, attention is first directed to FIG. 1. This figure illustrates a sodium-sulfur battery constructed in accordance with the present invention and generally designated by the reference numeral 10. This battery includes an overall outer housing 12 including two steel tubular sections, a lower section 14 and an upper section 16 which are separated by and interconnected with one another by an alpha-alumina separating ring 18, which is thermally bonded to the two steel tubular sections using aluminum washers 20. The otherwise free ends of the two steel sections are closed by steel end caps 22, each including a center tube 24 which initially serves to draw a vacuum within its respective housing section and which is thereafter closed off as indicated by the pinch off weld.

Sodium-sulfur battery 10 also includes a longitudinally extending beta-alumina tube 26 opened at one end 28 and closed at its opposite end 30. This tube which serves as a separator between the sodium and sulfur within the battery and is located within housing 12 such that most of the tube including its closed end 30 resides within and is spaced from tubular section 14. A short section of the beta-alumina tube including its open end projects into tubular housing section 16. The entire tube is held in this position by previously described separator ring 18 which has an inner diameter approximately equal to the outer diameter of the beta-alumina tube. In this regard, glass 31 may be utilized to fixedly connect these two components together.

As seen in FIG. 1, housing section 14, separating ring 18 and that portion of beta-alumina tube 26 within housing section 14 together define a continuous chamber 32.

This chamber serves to contain sulfur which is impregnated in a chemically inert electronic carrier, for example, carbon generally indicated at 34.

The components making up sodium-sulfur battery 10 thus far described may be conventional and readily provided by those with ordinary skill in the art. Moreover, these components including the beta-alumina separator and the sulfur cooperate with another and with sodium located on the interior of the separating tube (as will be described) in a conventional way to provide a predetermined operating potential.

In addition to the conventional components just described, battery 10 includes a sodium storage and dispensing arrangement 38 which is designed in accordance with the present invention to prevent the sodium from reaching the inner surface of beta-alumina tube 26 in the event that the average temperature along a predetermined section of the tube reaches a predetermined value. As seen best in FIG. 1, arrangement 36 includes an inner metal housing 38 located within the tubular section 16 of outer housing 12 and provided for containing the battery's supply of sodium.

Arrangement 36 also includes a bi-metallic tube 40 concentrically located within and spaced from beta-alumina tube 26 as illustrated in FIG. 1. This tube includes a central passageway 42 in fluid communication with the interior of inner housing 38 and the two together define an overall inner chamber for containing sodium. The tube is comprised of an outer steel layer 44 and an inner aluminum layer 46 which have different known coefficients of thermal expansion. More specifically, the coefficient of expansion for the outer steel layer is less than the coefficient of thermal expansion for the inner aluminum layer. The upper end of outer layer 44 as viewed in FIG. 1 is located adjacent to and is preferably connected with inner housing 38. In an actual working embodiment, the inner housing and the outer tubular layer are integrally formed with one another. The upper end of inner layer 46 is also located adjacent to inner housing 38 and, in fact, surrounds an opening 48 into the inner housing from passageway 42. The opposite end of the inner aluminum layer, that is the extreme left hand end as viewed in FIG. 1, stops short of the left hand end of outer layer 44. An end cap 49 similar to end caps 22 is fixedly located at and seals the forwardmost end of outer layer 44.

As will be seen below, the reason for providing the two layers just described is to open and close a passageway for sodium as a result of the difference in thermal expansion between the two layers. In this regard, the inner aluminum layer 36 which expands more than the outer layer may be divided into two longitudinal sections by dotted line 50 for purposes of description. The lowermost section 46a includes a front segment having an outermost diameter $d_1$ slightly less than the inner diameter of steel outer layer 44 and a back segment having a still reduced diameter $d_2$. In this way, lowermost section 46a is free to expand and contract relative to the lowermost section 44a of outer layer 44 without binding therein. However, these two components are sufficiently close to prevent passage of liquid sodium therebetween. On the other hand, uppermost section 46b has an outermost diameter $d_3$ which is equal to and preferably slightly greater than the inner diameter of layer 44 so as to provide a press-fit between section 46b and section 44b of the outer layer for minimizing relative expansion between the two. For example, in an actual working embodiment, inner diameter of layer 44 is 1.905 cm while the inner diameter $d_3$ is 1.918 cm. These dimensions are to be contrasted with the diameter $d_1$ which is 1.900 cm and $d_2$ which is 1.85 cm. In order to further lock rearward section 46b with section 44b, the locking pin 52 is fixably located in cooperating openings in the two layers as illustrated in FIG. 1. By interconnecting the two layers of tube 40 together in this way, differential expansion between the two is directed to only a section of the tube and hence can be accurately designed.

The bimetallic tube just described includes a passageway generally indicated at 54. As will be seen hereinafter, this passageway serves to dispense sodium from housing 38 and central passageway 42 to a location outside the bimetallic tube and in contact with the inner surface of beta-alumina tube 26 under certain predetermined thermal conditions. In a preferred embodiment, passageway 54 is separated into two passageway sections, a circular through-hole 56 in outer layer 44 and a groove 58 semi-circular in cross-sectional configuration located in the forwardmost end of inner layer 46. In this preferred embodiment, passageway 54 also includes a through-slit 60 narrower than the diameter of through-hole 56 and extending across the through-hole through outer layer 44, and as best seen in FIGS. 3A, 3B and 3C as well as FIG. 4. The slit may also extend into the front face of inner layer 46, as shown.

Having described overall sodium-sulfur battery 10 from a structural standpoint, attention is now directed to the way in which it is assembled and operated. In assembling the battery, inner aluminum layer 46 is initially inserted into outer steel layer 44 so as to provide a press-fit between sections 44b and 46b of the two layers. Pin 52 is positioned as shown and, in ths regard, in a preferred embodiment, the cooperating openings in the two layers for the pin are not drilled until the two layers are assembled. The end cap 49 with its center tube opened is positioned in the free end of outer layer 44 and this may be done before or after pin 52 is provided, although the end cap is preferably not permanently fixed in place (as for example by welding) until after the pin is provided. Thereafter, liquid sodium, preferably sodium maintained at slightly above its melting point, is provided through the center tube of end cap 49 so as to fill housing 38, passageway 42 and the space between the forwardmost end of inner layer 46 and the end cap. The center tube is then pinch welded to seal in the sodium and the latter is allowed to cool down and solidify. Thereafter, through-hole 56 and groove 58 are provided by means of drilling using a single drill bit and drilling the hole and groove at the same time. In an actual embodiment, the center of the through-hole is initially aligned that groove is one-half that of the through-hole (semi-circular) in cross section. In this regard, the solidified sodium filling the space between the inner aluminum layer and the end cap aids in maintaining the drill bit in place as the latter provides the groove. The through-slit 60 is initially located just in front of the free end of inner layer 46 and is provided by means of a saw.

After providing the tube 40 which is actually a bimetallic valve and housing 38 as described, this entire unit is assembled with the beta-alumina tube by inserting the bimetallic tube concentrically within and spaced from the beta-alumina tube so that housing 38 is located just outside the open nd of the beta-alumina tube. This combination is in turn mounted within outer housing 12. In this regard, the beta-alumina tube is fixably supported in place within the outer housing and sulfur impregnated carbon by means of separator 18 in a conventional manner. The inner housing 38 is fixably held in place by means of spacers (not shown) between the inner housing and the upper section 16 of the outer housing such that bimetallic tube 40 is concentrically located within and spaced from the inner walls of the beta-alumina tube a small distance. As a final step in the overall assembly of battery 10, a vacuum is drawn in outer housing 12 through the center tubes of caps 24 and the center tubes are thereafter pinch welded.

In operating sodium-sulfur battery 10, the latter is brought up to its normal operating temperature which is about 330° C. in the embodiment illustrated. Obviously, when the sodium within the battery reaches about 100° C., its melting point, it turns to liquid and begins passing out of passageway 54 and into contact with the interior surface of beta-alumina tube 26. At this time, the average temperature along bimetallic tube 40 and particularly the forward section 40a (in front of dotted line 50) is about 100° C., resulting in a slight difference in expansion between sections 46a and 44a of the inner and outer layers of tube 40 (hereinafter referred to as "expansion differential".) However, this difference is not enough to provide any significant difference in passageway 54. Therefore, both the through-hole 56 and groove 58 as well as the slit 60 are available to pass sodium (arrow 61) as seen in FIGS. 2A and 3A. The slit 60 serves to increase the amount of sodium passing into contact with the beta-alumina tube at relatively low temperatures (e.g. 100° to 150° C.) to permit rapid filling of the beta-alumina tube at the outset of operation. As the average temperature of the beta-alumina tube and tube section 40a increases in temperature, the expansion differential inreases causing passageway 54 to decrease in cross-section.

When the operating temperature of the battery reaches a predetermined point above 100° C. but below its operating temperature, for example a temperature of 150° C., causing the average temperature of tube section 40 to reach this level, the expansion differential between inner section layer 46a and outer layer section 44a changes the passageway as shown in FIGS. 2B and 3B. There, it can be seen that the expansion differential is sufficient to completly close off slit 60 but still provides an opening for passage of sodium along through-hole 56 and groove 58 (arrow 63).

A passageway sufficient to pass the sodium is always provided so long as the average temperature of tube section 40a does not exceed a predetermined value above the normal operating temperature of the battery, for example 360° C. in a preferred embodiment. In the event that the average temperature reaches this value, the expansion differential between the inner and outer sections 44a and 46a causes passageway 54 to change further as shown in FIGS. 2C and 3C. There, it can be seen that the aluminum has expanded sufficient to completely close off through-hole 56 and slit 60 preventing any further sodium from passing into contact with the beta-alumina tube. As a result, once the sodium which is already in the beta-alumina tube is expended through reaction with the sulfur the battery will no longer operate and cool down.

From the foregoing, it should be apparent that localized hotspots along the length of the beta-alumina tube as a result of localized cracks in the latter will spread through the entire tube and cause its overall temperature to rise. This will in turn cause the bimetallic tube to heat to the same temperature causing the expansion differential between its aluminum layer and the steel layer to increase. If this hot spot is sufficiently high to increase the average temperature of the bimetallic tube section 40a to the critical value (e.g. 360° C.) then the passageway will close. In other words, tube (valve) 40 is responsive to local hot spots. For example, assume that the beta-alumina tube and bimetallic tube are operating at 330° C. when a crack in the former causes a localized increase in temperature sufficiently higher than 360° C. to raise the average temperature of tube section 40a to 360°. Under these circumstances, the passageway will close.

Sodium-sulfur battery 10 has been described in accordance with its preferred embodiment. It is to be understood, however, that the present invention is not limited to the particular configuration of tubular valve 40 as described above or the particular configuration of passagesway 54. For example, it is within the spirit of the present invention to provide a bimetallic valve with metals of different coefficients of expansion other than aluminum and steel. It is also within the spirit of the present invention to provide the metal with the greater coefficient of expansion as the outer layer and, in any case, the passageway is not limited to one including a slit in conjunction with a through-hole and a groove but rather could include two through-holes, for example. Obviously, the exact configuration of the passageway and the various dimensions of the valve including the passageway to provide reliable operation will depend upon the particular valve configuration and the materials used in constructing it, all of which can be readily provided by those with ordinary skill in the art by following the teachings herein.

Having described sodium-sulfur battery 10 and its method of operation, attention is now directed to FIGS. 5 and 6 which illustrate a sodium-sulfur battery constructed in accordance with a second and preferred embodiment of the present invention. This battery which is designated by the reference numeral 10' is identical to battery 10, with certain exceptions to be discussed below. The identical features of battery 10' include its outer housing which corresponds to housing 12 but which is not shown in FIG. 5 except for separating ring 18 and glass 31. Other identical features include beta-alumina tube 26 as well as the inner metal housing 38 and the outer steel layer 44 comprising part of the previously described sodium storage and dispensing arrangement 36. However, the sodium storage and dispensing arrangement comprising part of battery 10' and generally designated by the reference numeral 36' includes a bi-metallic tube 40' including not only outer steel layer 44 but an inner aluminum layer 46' which is different than previously described inner aluminum layer 46, as will be seen below. This difference and one other relating to the way in which the inner aluminum layer is mechanically interlocked with its outer steel layer 44 are the only significant differences between the two batteries 10 and 10'.

As seen in both FIGS. 5 and 6, inner aluminum layer 46' does not include a central through passage 42 but rather a channel or groove 42' extending along its outer surface from its top end adjacent housing 38 to its bottom end adjacent passageway 54 corresponding to the same passageway in FIG. 1. Passageway 42' serves the same purpose as previously described passageway 42, that is, for delivering sodium from container 38 to the entry of passageway 54 for passing through this passageway when the latter is open. Moreover, the inner aluminum layer itself serves the same function as layer 46 in the overall bi-metallic tube. In this regard, while component 46' is actually not a "layer" in the technical sense, for purposes of consistency with respect to the embodiment shown in FIG. 1, it will be designated as such.

The only other differences between the battery 10' and battery 10 resides in the way in which the two components making up the bi-metallic tube 40' are interlocked, as stated above. In the embodiment shown in FIGS. 5 and 6, an interlocking pin 52' is provided entirely through inner aluminum layer 46' in a direction normal to the axis of this layer and through its axis, as best seen in FIG. 5. This inner locking pin also extends through both sides of outer steel layer 44 as seen best in FIG. 6. In this regard, the primary purpose for providing a channel type passage 42' in the inner aluminum layer rather than a central passage 42 is to accomodate passage of innerlocking pin 52'. However, an additional advantage to providing the channel rather than a central passage is that the former may be provided more reliably and more economically than the latter. With respect to the innerlocking pin itself this longer pin will take greater axial loading than the shorter pin 52, thus providing a more secure interlock between the two components making up the bi-metallic tube.

What is claimed is:

1. In a sodium-sulfur battery including sodium and sulfur separated by and in direct contact with a beta-alumina separating means, a sodium storage arrangement comprising housing means defining an inner chamber for containing a supply of sodium out of contact with said separating means, said housing means including thermally responsive sodium dispensing means for passing sodium out of said chamber and into contact with said separating means when said sodium is in a liquid state but only so long as the average temperature along at least a predetermined section of said separating means remains below a predetermined value, said dispensing means preventing the passage of liquid sodium from said chamber to said separating means if the average temperature along said section reaches said predetermined value.

2. An arrangement according to claim 1 wherein said dispensing means varies the amount of liquid sodium passing from said chamber to said separating means over a predetermined range of average temperatures along said section including said predetermined value as its upper limit.

3. An arrangement according to claim 1 wherein said housing means includes a bimetallic section serving as said dispensng means and comprising adjacent layers of metal which have different coefficients of thermal expansion and which are free to thermally expand and contract relative to one another, said bimetallic section defining a passageway between said housing chamber and said separating means so long as said average temperature remains below said value and eliminating said passageway through relative expansion of said layers if said average temperature reaches said value.

4. In a sodium-sulfur battery including sodium and sulfur separated by and in direct contact with a beta-alumina separating tube, a sodium storage arrangement comprising means located outside said separating tube for containing a supply of sodium and thermally responsive valve means in fluid communication with said sodium containing means, said valve means being automatically movable between (i) an opened position for dispensing sodium from said containing means into contact with the inner surface of said separating tube when said sodium is in a liquid state and so long as the average temperature along at least a predetermined section of said tube remains below a predetermined value and (ii) a closed portion for preventing said dispensing of liquid sodium if the average temperature along said section reaches said predetermined value.

5. An arrangement according to claim 4 wherein said valve means comprises a bimetallic tubular section located within said separating tube and having adjacent inner and outer layers of metal which have different coefficients of thermal expansion and which are free to thermally expand and contract relative to one another, said bimetallic tubular section defining a passageway for sodium so long as said average temperature remains below said value and eliminating said passageway through relative expansion of said layers if said average temperature reaches said value.

6. An arrangement according to claim 5 wherein said inner layer is constructed of aluminum and said outer layer is steel.

7. An arrangement according to claim 5 wherein said bimetallic tubular section includes a free end and wherein said outer layer includes a segment extending beyond said inner layer and displaying a smaller coefficient of expansion than the latter, said passageway including a through-hole in said extending through outer layer segment.

8. An arrangement according to claim 7 wherein said passageway includes a groove in the free end of said inner layer, at least a section of said groove being in direct fluid communicating alignment with said through-hole so long as said average temperature is below said predetermined value.

9. An arrangement according to claim 7 wherein said through-hole is circular in cross-section and wherein said passageway includes an elongated slit narrower than the diameter of said through-hole, said slit extending through said outer layer across said through-hole and normal to the longitudinal axis of the tubular section.

10. An arrangement according to claim 5 wherein said predetermined temperature value is about 360° C.

11. A sodium-sulfur battery comprising an outermost housing, an elongated beta-alumina tube contained within said housing and having one opened end and an opposite closed end, means containing sulfur within said housing and outside said beta-alumina tube, and a sodium storage and dispensing arrangement contained within said outer housing, said arrangement including an inner housing located outside said beta-alumina tube and containing a supply of sodium and thermally responsive valve means including a bimetallic tubular section located within said beta-alumina tube and in fluid communication with said inner housing, said bimetallic tubular section having adjacent inner and outer layers of metal which display different coefficients of thermal expansion and which are free to thermally expand and contract relative to one another, and a passageway in said tubular section for dispensing sodium from said inner housing into contact with the inner surface of said beta-alumina tube when said sodium is in a liquid state and so long as the average temperature along said tubular section of said valve means remains below a predetermined value, said passageway being closed by the relative expansion of said metal layers if said average temperature reaches said predetermined value whereby to prevent further dispensing of liquid sodium from said inner housing to the inner surface of said beta-alumina tube.

12. A method of operating a sodium-sulfur battery which includes sodium and sulfur separated by and in direct contact with a beta-alumina separating means, said method comprising the steps of containing a supply of sodium in a reserve chamber out of contact with said separatng means, dispensing sodium from said supply and into contact with said separating means when said sodium is in a liquid state and so long as the average temperature along at least a predetermined section of the said separating means remains below a predetermined value, and automatically preventing the dispensing of liquid sodium from said supply to said separating means if said average temperature reaches said predetermined value.

13. A method according to claim 12 including the step of varying the amount of liquid sodium passing from said chamber to said separating means over a predetermined range of average temperatures along said section including said predetermined value as its upper limit.

14. A method according to claim 12 wherein said sodium is dispensed through a passageway in a thermally responsive valve means and wherein said step of preventing the passage of sodium includes automatically closing said passageway when said average temperature reaches a predetermined value.

15. A method according to claim 14 wherein said thermally responsive valve means includes a bimetallic section comprised of adjacent layers of metal which have different coefficients of expansion and which are free to thermally expand and contract relative to one another, said bimetallic section defining said passageway and said step of closing said passageway including the step of thermally expanding one of said metal layers of greater distance than the other said metal layers.

16. An arrangement according to claim 7 wherein said passageway includes a section through said inner aluminum layer, from one end of the latter to its other end.

17. An arrangement according to claim 7 wherein said inner aluminum layer is solid and wherein said passageway includes a channel extending along the surface of said inner aluminum layer from one end of the latter to its other end.

18. An arrangement according to claim 17 wherein said bimetallic tubular section includes means for mechanically interlocking a section of said inner aluminum layer with a section of said outer steel layer, said interlocking means including a locking pin extending entirely through said inner layer normal to its axis and through said outer layer on both sides of said inner layer.

* * * * *